(12) United States Patent
King

(10) Patent No.: US 9,874,361 B2
(45) Date of Patent: Jan. 23, 2018

(54) COOLING SYSTEM FOR BUILDINGS AND METHOD

(71) Applicant: Louis King, Phoenix, AZ (US)

(72) Inventor: Louis King, Phoenix, AZ (US)

( * ) Notice: Subject to any disclaimer, the term of this patent is extended or adjusted under 35 U.S.C. 154(b) by 81 days.

(21) Appl. No.: 14/989,374

(22) Filed: Jan. 6, 2016

(65) Prior Publication Data

US 2017/0191682 A1 Jul. 6, 2017

(51) Int. Cl.
| | | |
|---|---|---|
| *F24F 5/00* | (2006.01) | |
| *F24F 7/013* | (2006.01) | |
| *E04D 13/17* | (2006.01) | |
| *F24F 6/04* | (2006.01) | |
| *F24F 7/02* | (2006.01) | |
| *F24F 1/00* | (2011.01) | |

(52) U.S. Cl.
CPC .......... *F24F 5/0035* (2013.01); *E04D 13/178* (2013.01); *F24F 6/043* (2013.01); *F24F 7/013* (2013.01); *F24F 7/025* (2013.01); *F24F 2001/0088* (2013.01); *F24F 2221/20* (2013.01)

(58) Field of Classification Search
CPC .......... F24F 5/0035; F24F 7/025; F24F 6/043; F24F 7/013; F24F 2001/0088; F24F 2221/20

USPC .......................................................... 454/205
See application file for complete search history.

(56) References Cited

U.S. PATENT DOCUMENTS

| | | | | |
|---|---|---|---|---|
| 2,604,311 A | * | 7/1952 | Summerhill | F24F 6/043 239/43 |
| 4,194,328 A | * | 3/1980 | Peirson | E04B 1/3205 52/236.6 |
| 2008/0308253 A1 | * | 12/2008 | Knape, Jr. | F24F 5/0035 165/47 |

* cited by examiner

*Primary Examiner* — Cassey D Bauer
(74) *Attorney, Agent, or Firm* — Parsons & Goltry; Robert A. Parsons; Michael W. Goltry

(57) ABSTRACT

A cooling system for a building including a lower space and an upper space with a ceiling positioned therebetween. The lower space has a window and an opening in the ceiling is spaced from the window so that the lower space is in air communication with the upper space. The window is covered by water absorbent, porous material having a water source in communication therewith. An opening from the upper space to the outdoors is positioned the length of the upper space from the opening in the ceiling. A fan system is positioned in the upper space to draw air form the lower space and directs the air out the opening to the outdoors. Whereby air is drawn through the water absorbent, porous material, through the opening in the ceiling, and travels the length of the upper space before exiting through the opening from the upper space to the outdoors.

11 Claims, 2 Drawing Sheets

COOLING SYSTEM FOR BUILDINGS AND METHOD

FIELD OF THE INVENTION

This invention generally relates to cooling systems and more particularly to cooling systems for occupied buildings, such as homes and the like.

BACKGROUND OF THE INVENTION

At present the most popular system for cooling homes, office buildings, etc. is air conditioning, including heat exchangers. However, air conditioning is very expensive to install and to operate. In air conditioning systems the compressor is expensive and very costly to operate. It is also well known that air conditioners require regular maintenance and service. Also, most compressors need to be exchanged every few years, which can add substantially to the cost. Also, air conditioners automatically dry the air in the building being cooled so that continued operation can be uncomfortable and unhealthy.

Current window or roof mounted evaporative coolers are generally undesirable because they tend to blow cool air directly on an individual or an area and create relatively high air currents that are or can be irritating. In systems where the damp air is directed through heating ducts and the like, the damp air can damage the ducts and mold, etc. can form in the ducts causing many health problems.

It would be highly advantageous, therefore, to remedy the foregoing and other deficiencies inherent in the prior art.

Accordingly, it is an object of the present invention to provide a new and improved cooling system for occupied buildings.

It is another object of the present invention to provide a new and improved cooling system for occupied buildings that is inexpensive to install and to operate.

Another object of the invention is to provide a new and improved cooling system for occupied buildings that does not require regular maintenance.

Another object of the invention is to provide a new and improved cooling system for occupied buildings incorporating simple components that are easy to install and do not regularly require new components.

SUMMARY OF THE INVENTION

Briefly, to achieve the desired objects and advantages of the present invention a cooling system for buildings is disclosed. The building to be cooled includes a lower space and an upper space overlying the lower space with a ceiling positioned between and separating the lower space and the upper space, the lower space having a window opening to the outdoors, and an opening in the ceiling spaced from the window so that the lower space is in air communication with the upper space. The window defines an opening to the outdoors, the opening to the outdoors being covered by water absorbent, porous material having a water source in communication therewith. An opening from the upper space to the outdoors is positioned substantially the length of the upper space from the opening in the ceiling. A fan system is positioned in the upper space to draw air from the lower space, through the opening in the ceiling, and direct the air drawn from the opening in the ceiling out the opening from the upper space to the outdoors. Whereby air is drawn through the water absorbent, porous material, through the opening in the ceiling spaced from the window, substantially the length of the upper space, and exits to the outdoors through the opening from the upper space to the outdoors.

To further achieve the desired objects and advantages of the present invention a method of cooling a building is disclosed. The building includes a lower space and an upper space overlying the lower space with a ceiling positioned between and separating the lower space and the upper space, the lower space having a window opening to the outdoors. The method includes the steps of providing an opening in the ceiling spaced from the window so that the lower space is in air communication with the upper space, at least partially opening the window to the outdoors and covering the open window with a water absorbent, porous material having a water source in communication therewith, providing an opening from the upper space to the outdoors positioned substantially the length of the upper space from the opening in the ceiling, and providing a fan system positioned in the upper space to draw air from the lower space, through the opening in the ceiling, and directing the air drawn from the opening in the ceiling out the opening from the upper space to the outdoors. Whereby the lower space and the upper space are both cooled as air is drawn through the water absorbent, porous material, through the opening in the ceiling spaced from the window, substantially the length of the upper space, and exits to the outdoors through the opening from the upper space to the outdoors.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
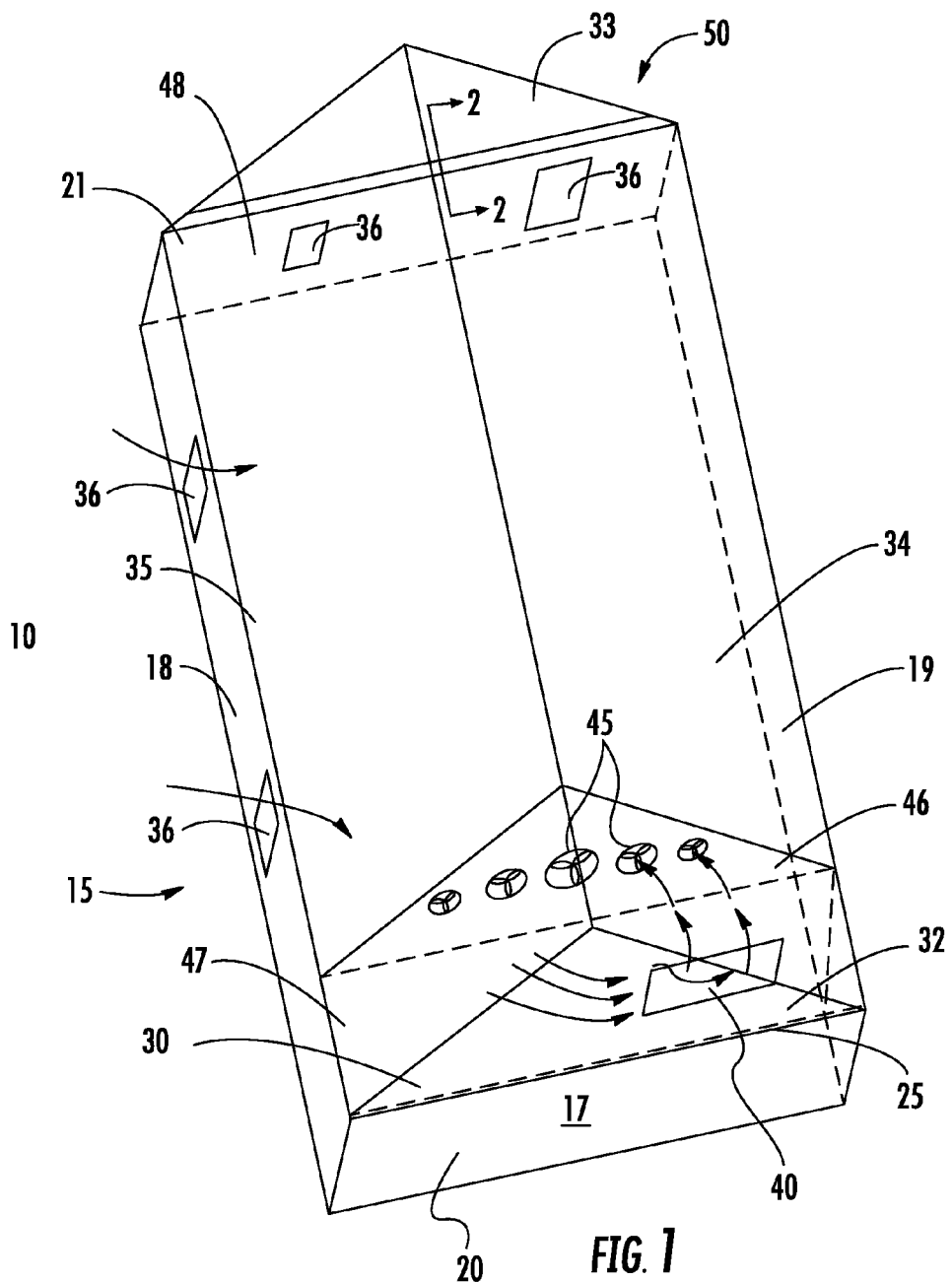
FIG. 1 is a simplified isometric view of a cooling system in installed in a building in accordance with the present invention.

Turning now to the drawings, attention is first directed to FIG. 1 which illustrates a cooling system 10 in accordance with the present invention. In this example, cooling system 10 is installed in a single-floor building 15 for convenience in understanding this explanation. Building 15 includes a ground floor space 17 defined by opposed side walls 18 and 19, end walls 20 and 21, and a ceiling 25. An area directly above ground floor space 17, defined by the upper surface of ceiling 25, triangular end walls 32 and 33, and slanted roof members 34 and 35, is generally referred to as an attic area 30. In the present example building 15 is a simple home in which the ground floor space 17 generally is divided into a plurality of different rooms (e.g. living room, dining room, bedrooms, kitchen, etc.). Further, it will be understood that these various rooms generally include windows, four of which designated 36, are illustrated in FIG. 1 for example. While a simplified building is described here for convenience, it will be understood from the following description that cooling system 10 could be installed in literally any building that one desires to cool.

In cooling system 10, one or any number of the four windows 36 are at least partially open and the open area is covered with a water absorbent material that is sufficiently porous to allow air to flow through in an only partially obstructed manner. Typical examples of such water absorbent, porous material are cloth, pads formed of compressed fibrous plastic or the like, some types of wire mesh, typical filters and filter material, etc. Each window 36 is further provided with a source of water which is allowed to drip onto or flow along the water absorbent, porous material. The water source can be, for example, plastic conduits that allow a very limited amount of water to flow from the upper end of the water absorbent, porous material downwardly to a collection trough at the lower end. As will be understood from the following disclosure, it is preferred that the amount of water being supplied at the upper end of each window is just sufficient to reach the lower end before evaporating and is sufficient to maintain the porous material in a damp state whenever the system is operating. In some applications it may be desirable to provide each window 36 with a small separate reservoir of water and a small electric pump to circulate the water continuously through the water absorbent, porous material. Generally, it is also desirable to associate the operation of the water source in each window with the operation of the system. That is, preferably the water source is turned on and off with the remainder of the system.

An opening 40 is provided in ceiling 25, preferably at an end of building 15 in a direction farthest away from all or most of open windows 36. Opening 40 is positioned to allow a free-flow of air from ground floor space 17 into attic area 30. Further, it is preferred that there is a free flow of from each window 36 to opening 40. It will be understood that opening 40 can be a single relatively large opening, as illustrated, or a plurality of smaller openings (not shown) distributed conveniently about ceiling 25. However, it should be understood that either opening 40 or the smaller openings should be positioned to provide the longest path of airflow through ground floor space 17.

One or more hi-velocity fans 45 are mounted in attic area 30 to provide air flow from opening 40, and/or smaller openings, along the length of attic area 30. The One or more hi-velocity fans 45 are generally referred to herein as a "fan system" which is intended to include whatever number of fans may be used and controls for regulating the air flow. In this preferred embodiment fans 45 are mounted in a triangular transverse separation wall 46 which separates attic area 30 into a first collection area 47 and an exhaust area 48, to aid in directing air from opening 40 across attic area 30.

Figure 2:
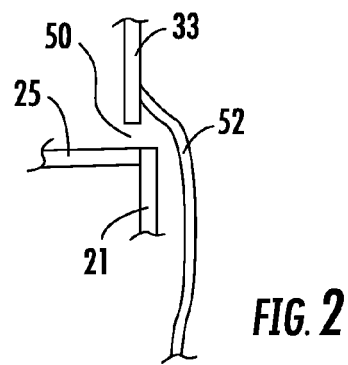
FIG. 2 is a sectional view along the line 2-2 in FIG. 1.

In this preferred embodiment, the opposite end of attic area 30 is provided with one or more openings, generally designated 50, in the lower edge of triangular end wall 33 so that the air space in exhaust area 48 of attic area 30 is in communication with the outdoors. Referring to FIG. 2, a deflector 52 is optionally provided over opening 50 to deflect air exhausted through opening 50 downwardly along the outer surface of end wall 21. Deflector 52 can be a flexible material hanging from triangular end wall 33 or simply a rigid portion fixedly attached to or formed as a portion of the outer surface of triangular end wall 33.

It can be seen that when hi-velocity fans 45 are in operation, air enters ground floor space 17 through any of windows 36 that are open. Water carried by the water absorbent, porous material in each window 36 evaporates and cools the air. The cool air passes through ground floor space 17, cooling ground floor space 17, and exits through opening 40 into first collection area 47. The cool air passes through fans 45 and is forced through exhaust area 48 and out opening 50 at the opposite end. The cool air travels from opening 50 downwardly along the outer surface of end wall 21. Thus, the air drawn in and cooled in each window 36 cools the entire ground floor space 17, attic area 30 and to at least some extent the outer surface of end wall 21. It will be readily understood by those of skill in the art that cooling attic area 30, in addition to the entire ground floor space 17, greatly enhances the cooling ability of cooling system 10.

To further enhance the cooling ability of cooling system 10 in attic area 30 some optional modifications may be made to building 15 when certain situations prevail. In the example illustrated in FIG. 3, attic area 30 defined by the upper surface of ceiling 25, triangular end walls 32 and 33, and slanted roof members 34 and 35, is originally open to roof rafters 60. That is the underside of the outer roof covering 62 is accessible between each pair of adjacent rafters. As is known in the art, heat from sun on the roof accumulates in this area and is traditionally dispersed in some fashion, for example one or more vents 64 extending through the roof, generally near the peak.

Figure 3:
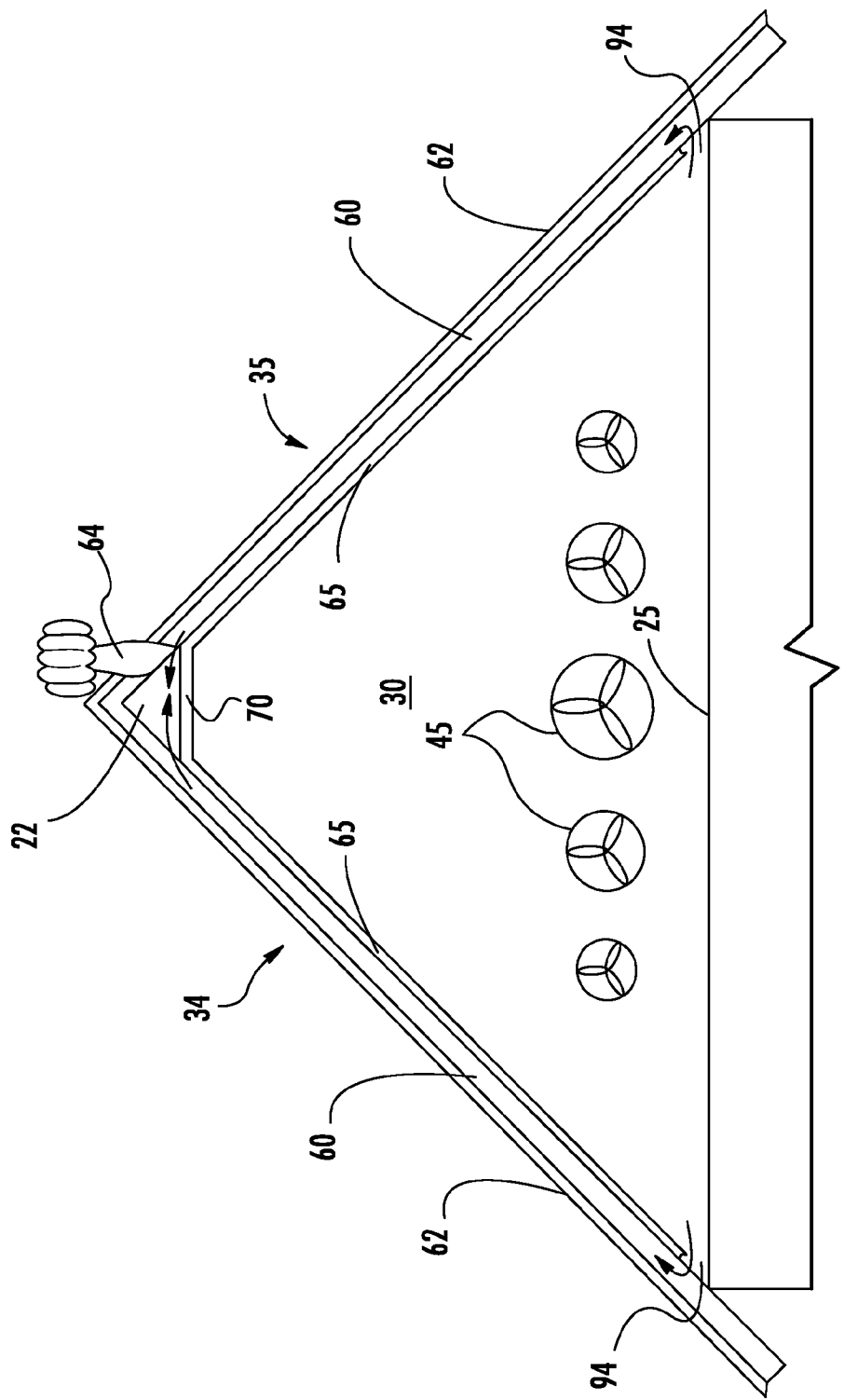
FIG. 3 is a sectional view of an attic area along the line 3-3 in FIG. 1.

An optional modification illustrated in FIG. 3 to further enhance heat dissipation, includes attaching enclosing sheets 65 of material to the underside of rafters 60. Sheets 65 could be for example, sheet rock, plywood, plastic, etc., but preferably are of a material to form an effective radiant barrier such as alternating layers of cotton sheets with aluminum foil formed as a composite with layers of adhesive. This radiant barrier reflects heat from the roof back toward the roof to avoid heating the attic. Sheets 65 are attached in the usual fashion by, for example, nails, screws, etc. Preferably, sheets 65 are terminated a short distance from the peak of the roof (i.e. where rafters 60 join together) and the peak area is enclosed by a horizontal piece 70 of enclosing material so that all of the air spaces between rafters 60 are in communication with a common air space 72. Thus, all of the heated air adjacent to the lower surface of outer roof covering 62 is free to travel upward and exit through vents 64.

Also, in this example sheets 65 optionally terminate a short distance, designated 74 in FIG. 23, from ceiling 25 to allow a small flow of cool air to enter between rafters 60 and help move the heated air toward vents 64. Thus, cool air from fans 45 is forced through exhaust area 48 and out opening 50 at the opposite end of attic area 30 and heated air from the roof is further separated to increase efficient cooling. Here it should be understood that the size of the volume enclosed by sheets 65 can vary, for example, by changing the distance that horizontal piece 70 is spaced from the peak of the roof. Changing the enclosed volume may in turn depend to some extent on the type and efficiency of vents 64.

It should be understood that cooling system 10 can be operated in a wide variety of modes, for example, fans 45 can be turned on continuously or operated by a thermostat or the like. Also, when several fans 45 are included, they can be operated to provide different amounts of air flow from zero flow to maximum flow. Also, as different portions of ground floor space 17 are used, windows 36 can be opened, partially opened, or closed to adjust the air flow and the consequent temperature.

Thus, a highly controllable cooling system for buildings is disclosed. Because of the simplicity of installation and operation, the novel cooling system is extremely affordable with a very short payback time. Also, most components are available at home improvement centers so that no special ordering or wait time is required. The novel cooling system accelerates the conversion of ozone to oxygen, produces no molds, toxins, or odors so that it sharply reduces respiratory problems. Also, air movement is generally relatively low so that it can be nearly unnoticeable to the individual experiencing the cooling effect. Since the air at this point is quite comfortable and of a low humidity, the inhabitant may decide to add a circulating fan to simulate a breeze to further cool his body.

Various changes and modifications to the embodiment herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A cooling system for buildings comprising:
   a building to be cooled including a lower space and an upper space overlying the lower space with a ceiling positioned between and separating the lower space and the upper space, the lower space having a window opening to the outdoors, and an opening in the ceiling spaced from the window so that the lower space is in air communication with the upper space;
   the window defining an opening to the outdoors, the opening to the outdoors being covered by water absorbent, porous material having a water source in communication therewith;
   an opening from the upper space to the outdoors and positioned substantially the length of the upper space from the opening in the ceiling;
   a fan system positioned in the upper space to draw air from the lower space, through the opening in the ceiling, and directing the air drawn from the opening in the ceiling out the opening from the upper space to the outdoors, whereby air is drawn through the water absorbent, porous material, through the opening in the ceiling spaced from the window, substantially the length of the upper space, and exits to the outdoors through the opening from the upper space to the outdoors; and
   a separation wall separating a portion of the upper space in communication with the opening in the ceiling from a portion of the upper space in communication with the opening from the upper space to the outdoors, and the fan system mounted in the separation wall.

2. The cooling system for buildings as claimed in claim 1 wherein the water absorbent, porous material and the water source are constructed and positioned to maintain at least a portion of the water absorbent, porous material continuously damp during operation.

3. The cooling system for buildings as claimed in claim 1 wherein the opening from the upper space to the outdoors is positioned at an opposite end of the upper space from the separation wall.

4. The cooling system for buildings as claimed in claim 1 further including a deflector associated with the opening from the upper space to the outdoors and positioned to deflect air exiting through the opening from the upper space to the outdoors downwardly along an outer wall of the building.

5. The cooling system for buildings as claimed in claim 1 wherein the window and the opening in the ceiling are positioned to provide the longest distance path of airflow through the ground space from the window to the opening in the ceiling.

6. The cooling system for buildings as claimed in claim 1 wherein the upper space is further defined by sheets of enclosing material attached to the underside of roof rafters to separate the underside of a roof covering from the upper space, the enclosing material forming a common air space adjacent a peak of the roof and in communication with air spaces formed between adjacent rafters.

7. A method of cooling a building including a lower space and an upper space overlying the lower space with a ceiling positioned between and separating the lower space and the upper space, the lower space having a window opening to the outdoors, the method comprising the steps of:
   providing an opening in the ceiling spaced from the window so that the lower space is in air communication with the upper space;
   at least partially opening the window to the outdoors and covering the open window with a water absorbent, porous material having a water source in communication therewith;
   providing an opening from the upper space to the outdoors positioned substantially the length of the upper space from the opening in the ceiling;
   providing a fan system positioned in the upper space to draw air from the lower space, through the opening in the ceiling, and directing the air drawn from the opening in the ceiling out the opening from the upper space to the outdoors, whereby the lower space and the upper space are both cooled as air is drawn through the water absorbent, porous material, through the opening in the ceiling spaced from the window, substantially the length of the upper space, and exits to the outdoors through the opening from the upper space to the outdoors; and
   providing a separation wall separating a portion of the upper space in communication with the opening in the ceiling from a portion of the upper space in communication with the opening from the upper space to the outdoors, and mounting the fan system in the separation wall.

8. The method as claimed in claim 7 including a step of providing a deflector associated with the opening from the upper space to the outdoors and positioning the deflector to deflect air exiting through the opening from the upper space to the outdoors downwardly along an outer wall of the building.

9. The method as claimed in claim 7 wherein the steps of at least partially opening the window to the outdoors and providing the opening in the ceiling include providing the longest distance path of airflow through the ground space from the at least partially open window to the opening in the ceiling.

10. The method as claimed in claim 7 wherein the steps of providing the opening from the upper space to the outdoors and providing the fan system positioned in the upper space include spacing the opening from the upper space and the fan system at opposite ends of the upper space.

11. The method as claimed in claim 7 including the steps of further defining the upper space by attaching sheets of enclosing material to the underside of roof rafters to separate the underside of a roof covering from the upper space, the enclosing material being attached to form a common air space adjacent a peak of the roof and in communication with air spaces formed between adjacent rafters.

* * * * *